United States Patent [19]

Burckhardt

[11] 4,440,452
[45] Apr. 3, 1984

[54] HYDRAULIC BRAKE SYSTEM FOR TWO-WHEELED VEHICLES

[75] Inventor: Manfred Burckhardt, Waiblingen, Fed. Rep. of Germany

[73] Assignee: Daimler-Benz Aktiengesellschaft, Fed. Rep. of Germany

[21] Appl. No.: 333,978

[22] Filed: Dec. 23, 1981

[30] Foreign Application Priority Data

Dec. 24, 1980 [DE] Fed. Rep. of Germany ....... 3049108

[51] Int. Cl.³ .......................... B60T 8/26; B60T 11/20
[52] U.S. Cl. ............... 303/6 A; 188/106 R; 188/344
[58] Field of Search ............... 303/6 A, 22 R, 6 R, 303/22 A, 6 C, 13; 188/345, 349, 195, 344, 106 P, 106 R, 106 A, 16, 354, 358–360; 60/552, 553, 560, 561, 562, 579–582

[56] References Cited

U.S. PATENT DOCUMENTS

| 3,839,868 | 10/1974 | Watanabe | 188/345 X |
| 4,058,346 | 11/1977 | Burckhardt | 303/22 R |
| 4,176,886 | 12/1979 | Watanabe | 303/6 A |
| 4,239,294 | 12/1980 | Burgdorf | 188/344 X |
| 4,274,518 | 6/1981 | Berisch | 188/344 |
| 4,289,359 | 9/1981 | Lüpertz et al. | 188/344 X |

FOREIGN PATENT DOCUMENTS

2847571  5/1980  Fed. Rep. of Germany ...... 188/344

Primary Examiner—Douglas C. Butler
Attorney, Agent, or Firm—Craig & Burns

[57] ABSTRACT

A hydraulic braking system for two-wheeled vehicles, with the system including a main brake cylinder associated with a rear axle braking circuit and a main brake cylinder associated with a front axle braking circuit, as well as with a braking force distribution device. The braking force distribution device is adapted to produce, in a specified ratio, a pressurization of both the rear axle braking circuit and front axle braking circuit when the main brake cylinder associated with the rear axle braking circuit is actuated. When the main brake cylinder associated with the front axle braking circuit is simultaneously manually actuated and the main brake cylinder of the rear braking circuit is actuated by a brake pedal, the force distribution device produces a reduction of the rear axle braking pressure. The main brake cylinder associated with the rear axle braking circuit is constructed as a tandem main brake cylinder having a primary pressure chamber delimited in an axial direction by a primary piston and a float mounted secondary piston. The secondary pressure chamber of the tandem main brake cylinder is associated as an output pressure chamber with the rear axle braking circuit. A piston of the main brake cylinder associated with the front axle braking circuit delimits an annular pre-pressure chamber connected in a communicating fashion with the output pressure chamber of the front axle braking circuit when the piston is in a resting position. After a small fraction of a working stroke, the communication is sealed off. A hydraulic feedback circuit is provided which includes a piston exerting a restoring force proportional to the front axle braking pressure upon the secondary piston of the tandem main brake cylinder.

21 Claims, 3 Drawing Figures

HYDRAULIC BRAKE SYSTEM FOR TWO-WHEELED VEHICLES

The present invention relates to a brake system and, more particularly, to a hydraulic brake system for two-wheeled vehicles, with the system including a main brake cylinder associated with a rear axle braking circuit and being adapted to be actuated by foot power, and a main brake cylinder associated with the front axle braking circuit and adapted to be actuated by manual power, as well as a braking force distribution means which, when the main brake cylinder associated with the rear axle braking circuit is actuated produces, in a specified ratio, pressurization of both the rear axle braking circuit and the front axle braking circuit and, when the main brake cylinder associated with the front axle braking circuit is simultaneously actuated manually and the main brake cylinder is actuated by foot power, produces a reduction in the rear axle braking pressure.

Brake systems for two-wheeled vehicles such as, for example, motorcycles of all classes as well as co-called scooters and mopeds, have been proposed which include a rear axle braking circuit actuatable by pedal actuation and a front axle braking circuit actuatable by actuating a hand lever, with the circuits being independent of one another. At least in heavy and medium-weight motorcycles, but often in two-wheeled vehicles of lighter classes as well, the front axle and rear axle brakes are constructed as hydraulic disc brakes.

With previously proposed brake systems, a braking of a two-wheel vehicle in a manner appropriate for traffic situations is especially difficult because with vehicles equipped with such brake systems, the locking of the front wheel and a locking of a rear wheel can lead to the two-wheeled vehicles being brought into an unstable situation. While it is true that a skilled driver, braking in a straight line, may be able to maintain his equilibrium even with the rear wheel locked, this is no longer possible when braking of the vehicle on a curve. Moreover, it is absolutely necessary to avoid a locking of the front wheel since, in this event with a two-wheeled vehicle, in contrast with a four-wheeled vehicle, the locking of the front wheel produces a completely unstable and uncontrollable situation.

Furthermore, it is somewhat difficult to meter the braking forces which may be exerted through the front axle brake circuit and rear axle brake circuit in such a manner that a braking delay which corresponds at least approximately to an ideal braking force distribution is produced. Additionally, many riders of two-wheeled vehicles, especially those who are also accustomed to operating a four-wheeled vehicle, initiate braking by activating the pedal-actuated rear axle brake and activate the hand-lever operated front axle brake only after a certain time delay. Not only does this action place a great deal of emphasis on the correct amount of delay in braking but in many cases creates a dangerous braking situation. More particularly, if an earlier actuation of the rear axle brake on the rear wheel nearly reaches a locking point, the unloading of the rear axle which results from an actuation of the front axle brake, keeping the rear axle brake force constant, leads nearly unavoidably to a locking of the rear wheel. In order to avoid this locking of the rear wheel, the rear axle braking force must be reduced at the same time as the front axle braking force is increased. The operation of the front axle and rear axle brakes in opposite direction, the increased braking in front and reduced braking at the rear, which is required for this is, as a rule, possible only for a very skilled rider of two-wheeled vehicles.

In order to facilitate a handling of the critical braking situations which arise during the operation of a two-wheeled vehicle even for less skilled "normal riders", who have only a conventional degree of skill in riding, hydraulic brake systems of the above proposed type have been developed for motorcycles with the respective brake circuits causing activation of the front axle brake at the same time that a foot controlled activation of the rear axle braking circuit occurs, and with a specific braking force distribution factor so as to thereby produce an increased braking delay. Furthermore, in such systems, the braking force distributor is provided which produces a reduction of the braking pressure in the rear axle brake circuit when the front axle brake is actuated additionally, thereby counteracting a locking of the rear wheel.

In, for example, Offelegungsschrift No. 28 47 571, a braking system of the aforementioned type is proposed wherein a second front axle brake is provided in addition to a first front axle brake. The second front axle brake is actuatable by a pedal-controlled actuation of a first main brake cylinder in combination with a rear axle brake, with the second front axle brake being activatable only by a hand-lever controlled actuation of a second main brake cylinder.

A disadvantage of the last proposed braking system resides in the fact that the braking force distributor has a complex detailed construction which will be described hereinbelow in greater detail only to the extent necessary for an understanding of the disadvantages of this proposed braking system which are considered serious. With regard to additional structural details of the braking force distributor and also problems which result from the implementation and utilization of the proposed braking system, such additional information can be gathered from the Offenlegungsschrift No. 28 47 571, incorporated herein by reference, to the extent necessary in understanding the present invention.

The braking force distributor includes a first pressure chamber connected in a communicating fashion with an output pressure chamber of a first pedal-controlled main brake cylinder. The first front axle braking circuit is connected to the pressure chamber. Additionally, the braking force distributor includes a second pressure chamber which is staggered with respect to the first by a larger step of a stepped piston and is delimited at its other end by a sleeve which is fitted in a pressure tight manner in a housing, in which sleeve the stepped piston is mounted, pressure tight and axially displacably with its smaller piston step. The rear axle brake circuit is connected to the second pressure chamber of the braking force distributor. As long as the first main brake cylinder is not actuated, the stepped piston is held in its resting position by an actuation of a spring. In the resting position, a pressure medium opening provided in the larger piston step is open so that the first and second pressure chambers communicate with one another. When the pressure in the first pressure chamber increases, a piston-controlled valve closes the pressure medium opening provided in the large piston step, whereupon the working stroke of the stepped piston begins and the pressure in the second pressure chamber, which determines the braking pressure in the rear axle brake circuit, increases with a certain force transmission ratio in proportion to the pressure prevailing in the first pressure chamber and determining the braking pressure in the first front axle braking circuit.

In order to produce a pressure drop in the rear axle brake circuit so as to counteract a locking of the rear wheel while simultaneously or on a delayed basis actuating the second front axle brake, a pressure piston is provided, with the pressure piston delimiting or defining on the one side, a third pressure chamber of the braking force distributor. The third pressure chamber communicates with the output pressure chamber of the main brake cylinder provided to actuate the second front axle brake and terminates in an extension of the stepped piston which penetrates the sleeve. A displacement of this pressure piston, resulting from a sufficient pressure increase in the second front axle brake circuit, so thereby transmitted to the stepped piston, with the result that the initial pressure in the second pressure chamber associated with the rear axle brake circuit decreases and, if the piston of the first main brake cylinder is held at its previously assumed position, the pressure in the first pressure chamber rises.

One disadvantage of the above described proposed braking system resides in the fact that, because of the above-noted constructional features, if, after the first front axle braking circuit and rear axle braking circuit are already activated, the hand lever actuated second front axle braking circuit is also activated, and the manual force required to increase the pressure in the second front axle braking circuit, apart from a component which is caused by the counter forces exerted to overcome restoring elements, is initially in any case equal to a product of the effective piston area of the second main brake cylinder with the momentarily prevailing brake pressure in the second front axle braking circuit, with which the pressure piston of the braking force distributor is also influenced. The feedback to the rider of the two-wheeled vehicle regarding the instantaneous operating status of the braking system, provided by the amount of manual force to be exerted in the braking phase contains only the information on the braking force component exerted by the second front axle braking circuit and not the component which is made effective by the already activated first front axle braking circuit. Moreover, the rider of the vehicle would receive this feedback signal if actuating only the second front axle braking circuit. This situation would be true until, when the pressure rose in the second front axle braking circuit, the forces acting upon the stepped piston of the braking force distributor in the opposite direction were in equilibrium. It would only be at this point in time that a displacement of the stepped piston, producing a reduction of the rear axle braking pressure would begin and only at this point in time that the increased manual force to be applied for an additional pressure rise in the second front axle braking circuit, by an amount which is characteristic of the braking pressure in the first front axle braking circuit, would there be a measure of the total braking forces acting upon the front axle.

In an initial stage of activation of the second front axle braking circuit, it is important for a correct metering of the total effective front axle braking force; however, the rider, as a rule, with the above-noted construction, would receive a feedback which corresponds only to a portion of the total braking force acting upon the front axle and would therefore run the risk of actuating the second front axle braking circuit more strongly than necessary thereby provoking a locking of the rear wheel and/or the front wheel of the vehicle. Thus, a disadvantage of this proposed braking system resides in the fact that an optimum metering of the braking forces is especially difficult in a braking situation of the two-wheeled vehicle which occurs frequently and is often critical.

Yet another disadvantage of the above proposed braking system resides in the fact that two front axle braking circuits and associated brake calipers are required thereby considerably increasing the total manufacturing and/or engineering costs of the brake system.

The aim underlying the present invention essentially resides in providing a braking system of the aforementioned type which ensures a safe operation under all braking conditions.

In accordance with advantageous features of the present invention, the foot or pedal actuated main brake cylinder is constructed as a tandem main brake cylinder having a primary pressure chamber delimited, in an axial direction, by a primary piston and a floating secondary piston The primary pressure chamber is constructed as an output pressure chamber for the front axle braking circuit and a secondary pressure chamber, delimited by the secondary piston and an inner end of a cylinder housing in an axial direction, is associated as an output pressure chamber with the rear-axle braking circuit. The piston of the main brake cylinder provided for a manual force control provides, alternative, and additional activation of the front axle braking circuit, and delimits an annular prepressure chamber which is connected, in a communicating fashion, with the output pressure chamber to which the front axle braking circuit is connected when the piston is in the resting position. After a small fraction of the working stroke of the piston, the pre-pressure chamber is sealed off in a pressure tight manner relative to the output pressure chamber of the main braking cylinder. A hydraulic feedback circuit is provided having a piston which is exposed to the output pressure of the manually actuatable main brake cylinder, with the piston exerting a restoring force proportional to the front axle braking pressure upon the secondary piston of the tandem main brake cylinder.

Important advantages of operating a brake system of the present invention resides in the fact that, in every braking situation, a counter force to be overcome in the manual or hand lever actuated braking operation during a pressure increase in the front axle braking circuit constitutes or forms an exact measure of the total effective braking force in the front axle braking circuit. Relative to this "perceptible" increase in braking force, the rider of the two-wheeled vehicle may estimate and meter a required amount of increase in the braking force in a considerably easier manner than when the feedback at the hand lever corresponds only to the amount of increase alone as in the case in the above-proposed system only in the initial phase.

A further advantage of the braking system of the present invention resides in the fact that every time the braking pressure in the front axle braking circuit increases, there is a proportional reduction of the braking pressure in the rear axle braking circuit and not, as in the previously proposed braking systems, only when a certain threshold value of the front axle braking pressure is exceeded.

A further advantage of the above proposed construction resides in the fact that the engineering or manufacturing costs required to construct the braking system is relatively low since, as in previously proposed braking systems, only one front-axle braking circuit is required and the tandem main brake cylinder provided for the combined activation of the front axle and rear axle braking circuits, as well as the cooperating additional main brake cylinder, can be of a favorably simple construction that corresponds to proven design principles.

In accordance with further features of the present invention, in order to provide for a low susceptibility to malfunction and wear as well as simplicity in construction and permit an especially smooth or efficient construction for the main brake cylinder of the braking system, in accordance with further features of the present invention, the piston of the manually actuated main brake cylinder includes two piston flanges disposed at an axial distance from one another and connected together by a slotted piston rod. The pre-pressure chamber extends or is located between the two piston flanges with a piston flange of the piston which delimits the output pressure chamber of the main brake cylinder on the one side being provided with a centrally disposed plate valve having a valve seat disposed on an outer end of the piston flange delimiting the output pressure chamber. The valve body is urged into a closed position by a pretensioned compression spring but when the piston is in a resting position, is supported against a stop pin integrally disposed in the housing and radially traversing a slot of the piston rod by means of a valve stem which traverses a valve bore of the piston flange whereby the valve body is held in an open position.

To also ensure a low susceptibility to malfunction and wear, in accordance with still further features of the present invention, the secondary piston, having a piston area delimiting the primary pressure chamber of the tandem main brake cylinder on one side, has a predetermined cross sectional area and a smaller piston stage which traverses the secondary pressure chamber in an axial direction. The smaller piston stage delimits a counterpressure chamber on one side in a narrower step which originates in the secondary pressure chamber and has a further cross sectional area. The chamber is connected in a communicating fashion by a pressure line with an output pressure line of the manually actuated main brake cylinder.

Advantageously, in accordance with the present invention, an area ratio of the effective area of the counter piston stage to the piston area delimiting the primary pressure chamber of the secondary piston or when these piston areas are made circular their diameter ratio, is in the range of 0.1 and 0.25 or between 0.3 and 0.5 and, is preferably equal to, 0.16 or 0.4.

Advantageously, in accordance with further features of the present invention, a characteristic braking force distribution factor, characteristic of a sole actuation of the tandem main brake cylinder, is between 0.8 and 1.2 and is preferably equal to 1.

By observing the above noted dimensioning rules for the braking force distribution factor and area ratio for the piston surfaces of the tandem brake cylinder which are subjected to pressure in the opposite direction, even with considerable differences in a static axle load distribution caused by a different number of riders on the two-wheeled vehicles, braking delays which are very good and nearly correspond to an ideal braking force distribution can be achieved with the braking system of the present invention.

Accordingly, it is an object of the present invention to provide a braking system for a two-wheeled vehicle which avoids, by simple means, short comings and disadvantages encountered in the prior art.

Another object of the present invention resides in providing a brake system for a two-wheeled vehicle which is simple in construction and therefore relatively inexpensive to manufacture.

Yet another object of the present invention resides in providing a brake system for a two-wheeled vehicle which facilitates a handling of critical braking situations even for less skilled vehicle operators.

A still further object of the present invention resides in providing a hydraulic brake system for two-wheeled vehicles which provides an approximately ideal braking force distribution under all braking situations.

A still further object of the present invention resides in providing a hydraulic brake system for two-wheeled vehicles which avoids a locking of a rear wheel of the vehicle.

Yet another object of the present invention resides in providing a hydraulic braking system for two-wheeled vehicles which readily provides a feedback of the braking force being applied.

Yet another object of the present invention resides in providing a hydraulic brake system for two-wheeled vehicles which has a low susceptibility to malfunction and minimizes wear of the components of the brake system.

These and other objects, features, and advantages of the present invention will become more apparent from the following description when taken in connection with the accompanying drawings which show, for the purposes of illustration only, one embodiment in accordance with the present invention, and wherein:

Figure 1:
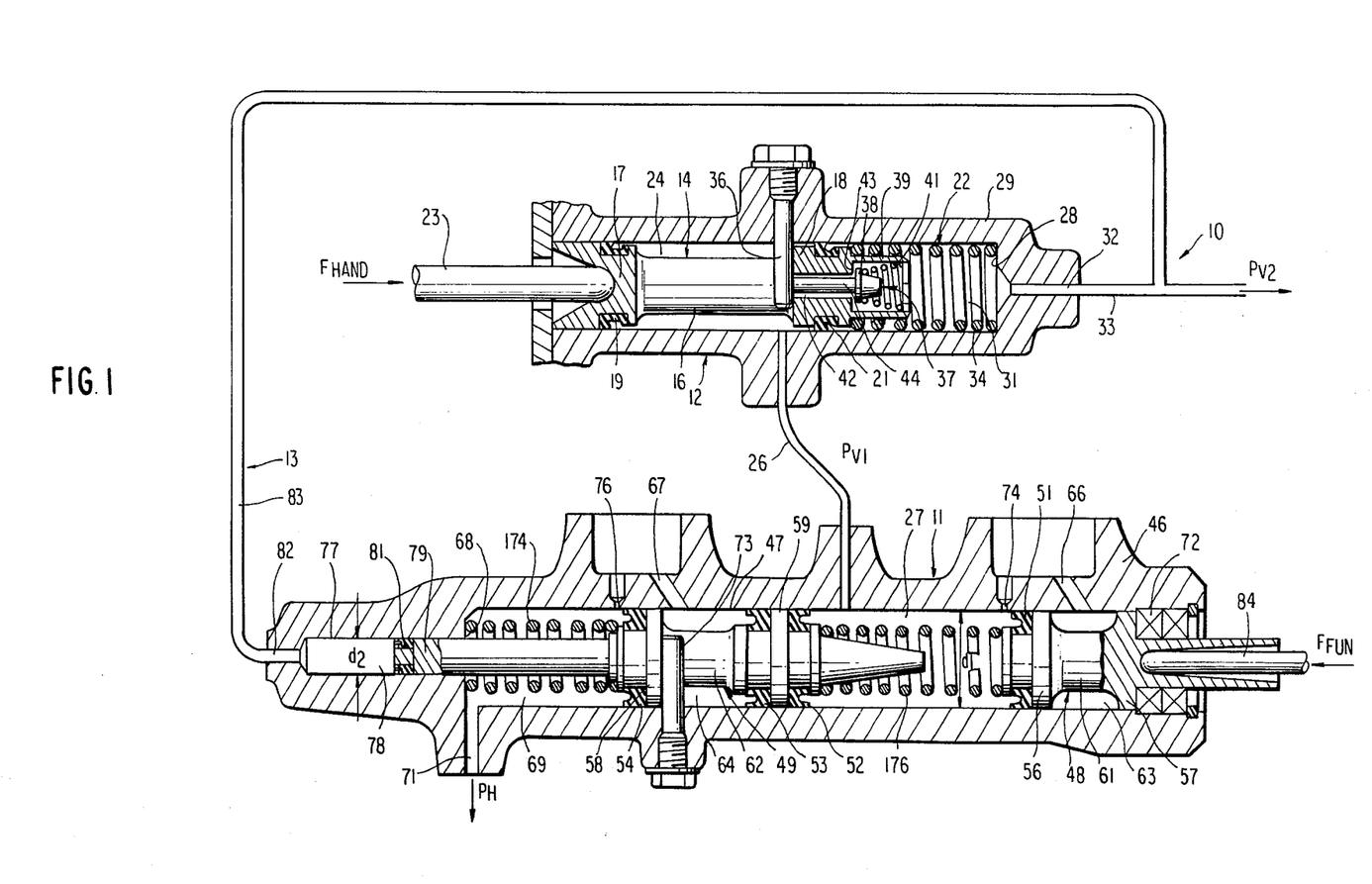
FIG. 1 is a partially schematic cross sectional view of a hydraulic braking system constructed in accordance with the present invention with a two circuit main brake cylinder, an additional main brake cylinder connected in series with the two circuit main brake cylinder and a front axle braking circuit, and a feedback circuit acting upon a rear-axle braking circuit.

Referring now to the drawings wherein like reference numerals are used throughout the various views to designate like parts and, more particularly, to FIG. 1, according to this Figure, a hydraulic braking system generally designated by the reference numeral 10 for a two-wheeled vehicle such as, for example, a motorcycle, includes a two circuit main brake cylinder generally designated by the reference numeral 11 which, as in previously proposed brake systems, is associated with a rear axle brake and which, when a pedal is actuated, initiates a combined activation of a front axle braking circuit and a rear axle braking circuit in a manner of a firmly established braking force distribution. For an additional or alternative activation of a front axle braking circuit, not otherwise described in greater detail, the front axle main brake cylinder generally designated by the reference numeral 12, is actuatable by a conventional hand operated lever. In order to counteract a locking of a rear wheel (not shown) of a two-wheeled vehicle which results from an increase in the front axle braking force component over and above the fixed braking force ratio, and which would further reduce a load on the rear wheel dynamically, a feedback circuit generally designated by the reference numeral 13 is provided, with the feedback circuit producing a reduction of a braking force in the rear axle braking circuit which is proportional to a braking force in the front axle circuit when the front axle main brake cylinder 12 is actuated.

The components of the braking system 10 described hereinabove by their functions, have the following detailed construction.

The front axle main brake cylinder 12, provided for a manual-force-controlled activation of the front axle brake, includes a piston generally designated by the reference numeral 14 provided with two piston flanges 17, 18, disposed at an axial distance or spacing from one another, with the flanges 17, 18 being rigidly connected together by a slotted piston rod 16. The flanges 17, 18 are sealed, in a conventional manner, by sleeves 19, 21 with respect to a cylinder bore generally designated by the reference numeral 22.

The outer piston flange 17, disposed at the left in FIG. 1, is engaged by a manually actuating element schematically represented by a push rod 23. A pre-pressure chamber 24 is defined or delimited between the outer piston flange 17 and the inner piston flange 18 illustrated in the right hand portion of FIG. 1. The pre-pressure chamber 24 communicates by a pressure line 26 with an output pressure chamber 27 of the two circuit main brake cylinder 11. The chamber 27 is associated with the front axle braking circuit. The cylinder 11 is constructed in a largely analagous fashion to that of a tandem main brake cylinder which is conventionally employed in two circuit braking systems for four-wheeled vehicles. An output pressure chamber is disposed between the inner piston flange 18 and an inner end surface 28 of a housing 29 of the front axle main brake cylinder 12. A pressure line 33 extends to the output pressure chamber, with the pressure line 33 leading to a front axle brake element such as, for example, a brake caliper of a brake disc (not shown). The pressure line 33 is connected to an outlet bore 32 provided in the housing 29.

As long as the front axle main brake cylinder 12 is not actuated, the piston 14 is held in the illustrated resting position by a pretensioned helical compression spring 34. The compression spring 34 abuts an inner end surface 28 of the cylinder housing 29 and the inner piston flange 18 of the piston 14. The resting position of the piston 14 is marked or defined by a rear stop of the inner piston flange 18 cooperating with a stop pin 36. The stop pin 36 projects into the longitudinal slot in the piston rod 16.

A central valve generally designated by the reference numeral 37 is provided on the inner piston flange 18. The central valve 37 is adapted to be open in the resting position of the piston 14 so as to produce a communicating connection of the pre-pressure chamber 24 with the output pressure chamber 31. In the illustrated embodiment, the central valve 37 is constructed as a plate valve and includes a valve body 38 disposed within a sleeve shaped extension 39 formed in the piston 14. The sleeve-shaped extension 39 extends from the piston flange 18 into the output pressure chamber 31. The valve body 38 is adapted to be urged or forced against an associated valve seat 43, surrounding an axial valve bore in the piston flange 18 in an annular fashion, by a frustoconical spring 41. The frusto-conical spring 41 abuts an inner fold of the sleeve-shaped piston extension 39. The spring force of the spring 41 is less than that of the helical compression spring 34 which forces the piston 14 into the resting position. With the piston 14 in the illustrated rest position, the valve body 38 is lifted from the seat 43 through the valve shaft 44 traversing the valve bore 42 and cooperating with the radial stop pin 36 whereby the valve body 38 is axially displaced a predetermined distance from the valve seat 43. Advantageously, the axial displacement of the valve body 38 is approximately 1 mm and corresponds to a small fraction of a possible actuating stroke of the piston 14.

The special tandem main brake cylinder 11, provided for a combined activation of the front axle and rear axle brake circuits includes a housing 46 having an elongated central bore 47 having a diameter $d_1$, with a primary piston generally designated by the reference numeral 48 being accommodated in the stepped central bore 47. A secondary piston generally designated by the reference numeral 49 is disposed in the stepped central bore 47. The primary piston 48 and secondary piston 49 are axially reciprocably displaceably mounted in the central bore 47 and are sealingly mounted in the bore 47 by means of suitable sealing means such as sleeves 51, 52, 53, 54, in a manner most clearly illustrated in FIG. 1.

The primary piston 48 and secondary piston 49 each have two piston flanges 56, 57 and 58, 59 disposed at an axial spacing from one another, with the flanges 56, 57 and 58, 59 being respectively connected together by a piston rod 61 or 62, with the respective piston rods being of a smaller diameter.

The flanges 56, 57 and 58, 59 respectively delimit or define annular spaces 63, 64, with the annular spaces 63, 64 being connected in a communicating fashion by means of a follower bore 66 and 67, with the corresponding partial volumes of an equalizing chamber (not shown) which contains a necessary supply of brake fluid.

The inner flange 56 of the primary piston 48 and the opposite flange 59 of the secondary piston 49 delimit or define an axially extending primary pressure chamber 27 of the tandem main brake cylinder 11. The primary pressure chamber 27 adjoins the pre-pressure chamber 24 of the front axle main brake cylinder by way of pressure line 26. The outer piston flange 58 of the secondary piston 49 and a delimiting surface 68 of the cylinder housing 46, located opposite the outer piston flange 58 delimit or define an axially extending secondary pressure chamber 69. The secondary pressure chamber 69 communicates, by way of a radial outlet bore 71, with a further extended pressure line of a rear axle brake circuit (not shown).

With the primary piston 48 in the illustrated resting position, the outer piston flange 57 is disposed against an outside sealing sleeve 72 of the tandem main brake cylinder 11. The outside sealing sleeve 72 may be integrally formed with the housing 46. In the illustrated resting position of the secondary piston 49, the flange 58, delimiting the secondary pressure chamber 69, is disposed against a stop pin 73 projecting radially into a longitudinally extending slot provided in the piston rod 62. The primary pressure chamber 27 and secondary pressure chamber 69 communicate through expansion ports 74 or 76 with partial volumes of a compensation tank associated with the two brake circuits.

As long as the tandem main brake cylinder 11 is not actuated, the primary piston 48 and secondary piston 49 are maintained in the illustrated resting position by a first pretensioned helical compression spring 174 abutting the left hand and delimiting surface 68 and secondary piston 49 and a second pre-tensioned somewhat weaker helicodial compression spring 176 abutting the secondary piston 49 and the primary piston 48.

As noted above, the construction of the tandem main brake cylinder 11 essentially corresponds to that of a conventional tandem main brake cylinder provided in wheel brake arrangement for four-wheeled vehicles.

In contrast with such a brake system, in the tandem main brake cylinder 11 provided in accordance with the present invention, an additional pressure chamber 78 is provided in an narrower bore step 77 having a diameter $d_2$. The additional pressure chamber 78 represents a continuation of the central stepped bore 47. The additional pressure chamber 78 is movably axially delimited by a piston step 79 which, beginning at the secondary piston 49, has a rod-shaped piston body extending through the secondary pressure chamber 69 in an axial direction. The piston step 79 has an annular sleeve 81 disposed at an end thereof, with the annular sleeve 81 sealing the further pressure chamber 78 tightly with respect to the secondary pressure chamber 69.

The additional pressure chamber 78 is connected by a pressure line 83 of the feedback circuit 13, connected to an axial outlet bore 82 of the housing 46, with the output pressure line 33 of the front axial main brake cylinder 12 and thus communicates with the output pressure chamber 31.

The brake system 10 of the present invention operates in the following manner.

In the event of an operation of a "hand brake" alone, the brake system 10 of the present invention operates as the previously proposed brake system does. As soon as the piston 14 is displaced toward the right of FIG. 1 as the result of a manual force actuation to the point where the valve body 38 abuts the valve seat 43 and seals the valve bore 42, any further displacement of the piston toward the brake results in a proportional increase in the braking pressure in the front axle braking circuit, whereby the force to be overcome on the manual lever for further pressure increases in proportional to the brake pressure prevailing at that moment in the front axle braking circuit. There is no feedback to the rear axle braking circuit since the stop pin 73 of the tandem main brake cylinder 11 prevents a deflection of the secondary piston 49 under the influence of the front axle braking pressure applied through the opposite piston step 79.

If foot power alone is applied to a brake pedal and acts through a push rod 84 upon the primary piston 48 of the tandem main brake cylinder 11, as soon as the sleeve 51 of the primary piston 48 seals the expansion port 74, as in the case even after a very small fraction of a possible working stroke of the primary piston 48, a pressure $P_{V1}$ builds up in the primary pressure chamber 27. The pressure $P_{V1}$ is transmitted through the pressure line 26 into the pre-pressure chamber 24 of the front axle main brake cylinder 12 and, since the central valve 37 is open, is also transmitted into the output pressure chamber 31 and thus to the front axle braking circuit as a braking pressure.

The pressure $P_{V1}$ prevailing in the primary pressure chamber 27 displaces the secondary piston 49, which is more or less free floating, toward the left in FIG. 1, whereupon, as soon as the sleeve 54 of the left piston flange 58 closes the expansion port 76, which likewise occurs after a small fraction of a possible work stroke of the secondary piston 49 has been executed, a braking pressure $P_H$ effective in the rear axle braking circuit builds up in the secondary pressure chamber 69. The rear axle braking pressure $P_H$ is again compensated, disregarding the effect of the return springs 74 and 76, provided within the framework of the brake system 10, equal to the pressure $P_{V1}$ in the primary pressure chamber 27, since the feedback of the pressure $P_{V1}$ upon the opposite piston 79, effective in the front axle braking circuit, again compensates for a pressure transmission which corresponds to a difference between the area of the piston surfaces of the secondary piston 49 which delimits secondary pressure chamber 69 and primary pressure chamber 27.

The front-axle braking circuit and rear-axle braking circuit with the aforementioned type of actuation of the braking system 10 are pressurized with the same braking pressures and, consequently, are pressurized in a firmly established braking force ratio. The front-axle main brake cylinder 12 thereby operates only as a "segment" of a brake line which runs from the primary outlet pressure chamber 27 to the brake caliper of the front-axle brake.

If the tandem main brake cylinder 11 and the front-axle brake cylinder are activated jointly, that is simultaneously, or also with a time delay, as soon as a manual force $F_{hand}$ is sufficient to displace the piston 14 of the front axle main brake cylinder, feed back circuit 13, subjected to the output pressure $P_{V2}$ of the main brake cylinder 12, becomes effective and causes the desired reduction of the output pressure $P_H$ of the secondary pressure chamber 69 which is effective in the rear-axle braking circuit.

For the following discussion, which disregards the restoring forces of the compression spring 34, 174, 176 as well as the losses due to friction, the piston surfaces, effective in delimiting the primary pressure chamber 27, of the primary piston 48 and of the secondary piston 49, which are equal to cross sectional surfaces $\pi d^2_1/4$, will be represented by reference character $A_1$; the effective piston area $\pi d^2_1/4$ is equal to $A_1$; the effective piston area $\pi d^2_1/4$ of the opposite piston state 79 is $A_1$; the piston area which is effective when the central valve of the front axle main brake cylinder 12 is closed is represented by $A_3$; and the actuating force to be applied to the tandem main brake cylinder 11 is designated $F_{foot}$.

With the above-defined parameters, the following relationships for the pressures $P_{V1}$, $P_{V2}$, and $P_H$ are effective in the braking system 10 of the present invention;

$$P_{V1} = F_{foot}/A_1, \quad (1)$$

where:
$$P_{V2} = P_{V1}, \text{ as long as } F_{hand}/A_3 < P_{V1}, \quad (2)$$

and $$P_{V2} = F_{hand}/A_3 \text{ for } F_{hand}/A_3 \geq P_{V1} \quad (3)$$

in a situation of simultaneous actuation of the two main brake cylinders 11, 12, from the equilibrium condition of the secondary piston 49 and opposite piston 79 for the pressure $P_H$ which is effective in the rear-axle braking circuit, the following relationship results:

$$P_H = P_{V1} = P_{V2} \text{ for } F_{hand}/A_3 < P_{V1}, \quad (4)$$

and $$P_H = \frac{A_1 P_{V1} - A_2 P_{V2}}{A_1 - A_2} = \frac{P_{V1} - (A_2/A_1)P_{V2}}{1 - A_2/A_1} \text{ for } \frac{F_{hand}}{A_3} \geq P_{V1} \quad (5)$$

As evident from relationship (4) when the tandem main brake cylinder 11 is actuated alone, equal braking pressures will prevail in both the front axle and rear axle braking circuits.

If the front axle main brake cylinder 12 is actuated as well, assuming that the foot pressure is maintained constant, the braking pressure $P_H$ in the rear axle braking circuit will decrease in accordance with relationship (5).

In accordance with relationship (3), which is also valid for a situation in which the tandem main brake cylinder 11 is not actuated, the manual force which permits a feedback through the braking pressure and is necessary for a pressure rise, will always be proportional to the front axle braking pressure $P_{V2}$.

If the tandem main brake cylinder 11 is operated alone, the brake system 10 will operate like a two circuit brake system with a fixed determination of the installed braking force distribution. On a braking force distribution graph, in which the front axle braking force $F_{BV}/F_G$ as a function of the vehicle weight $F_G$ is plotted as the abscissa in the rear-axle braking force $F_{BH}/F_G$ which is a function of the vehicle weight as plotted as the ordinate, the braking force distribution will correspond to a straight line running through the origin of the coordinates, with a slope of the straight line being given by the so-called braking force distribution factor DB, so that:

$$F_{BH}/F_G = DB \; F_{BV}/F_G. \quad (6)$$

With a braking delay z, a function of the vehicle weight, as a parameter which is composed additively of the vehicle-weight-dependent front-axle braking force component and rear axle braking force component, the following relationship exists:

$$z = F_{BH}/F_g + F_{BV}/F_G. \quad (7)$$

The straight line of the fixed braking force distribution may be expressed in parameter form by the following relationships:

$$F_{BV}/F_G = z(1 - \phi), \quad (8)$$

and $$F_{BH}/F_G = z\phi, \quad (9)$$

where $\phi$ represents a rear-axle braking force component with which the braking force distribution factor DB is linked in accordance with the following relationship:

$$DB = 1/(1/\phi - 1) \quad (10)$$

On a graph resulting from the above relationship, those points which represent brake states which correspond to equal braking force coefficients $\mu = \mu_H = \mu_V$ on the rear axle as well as on the front axle and represent an optimum braking delay lie on a parabola which begins at an origin of the coordinates with a finite positive slope and which the abscissas intersects at a point which corresponds to the status of the completely unloaded rear axle with a long brake delay.

The parameters of the above parabola are represented by the following relationships:

$$\frac{F_{BV}}{F_G} = z(1 - \psi + z\chi), \quad (11)$$

and $$\frac{F_{BH}}{F_G} = z(\psi - z\chi), \quad (12)$$

where:
$\chi = h/1$, the wheelbase-related height of the center of gravity with h equalling a vertical distance of the center of gravity of the vehicle from the road, and $1 =$ the wheelbase, and $\psi = F_{GH}/F_G$, which represents the static rear-axle load component.

Brake states with the same adhesion coefficient $\mu_H$ on the rear axle are represented in these relationships by straight lines which intersect the abscissa at a point $\psi/\chi$ at which the parabola also intersects the abscissa, and intersect the ordinates at points $\mu_K \psi/(1 + \mu_H \chi)$. The path of these lines may be graphically represented by the following analytical relationship:

$$\frac{F_{BH}}{F_G} = \frac{\mu \psi}{1 + \mu \chi} - \frac{\mu \chi}{1 + \mu \chi} \cdot \frac{F_{BV}}{F_G} \quad (13)$$

Brake states with a constant traction coefficient $\mu_V$ on the front axle in the above-defined system of coordinates likewise correspond to lines which have a common point of intersection with the ordinate $-(1 - \psi)/\chi$ and whose points of intersection with the abscissa are likewise given by points $\mu(1-\psi)/(1+\mu\nu\chi)$. Therefore, the parabola of the ideal braking force distribution is the geometric locus of the intersections of the curves which are valid for equal traction coefficients $\mu_H = \mu_V$.

Braking states of the brake system 10 of a constant braking delay z are represented by lines extending at an angle of 45° with the lines intersecting the abscissa and ordinate at a given value of a brake delay.

To the extent that the curve of the installed braking force distribution determined by the relationships (8) and (9) extends of runs "above the parabola" with a progressive increase in braking force, the locking limit will be reached in the rear wheel first while, in the event the curve runs "below" the parabola, it will be the front wheel that locks first.

Since the locking of the rear wheel, as noted at the outset, would represent the lesser of two evils in the case of a motorcycle, taking into account the riding and braking stability, the fixed braking force distribution must always be designed in such a manner that the characteristic curve always runs above the parabola, that is, in the limiting case it forms a tangent to the parabola at the origin of the coordinates. In this manner, it is ensured that the rear axle will always lock up before the front axle, but if the tandem main brake cylinder 11 is actuated alone, a considerable amount of weight would be placed upon a braking delay. On the other hand, if a tuning of the installed brake force distribution were selected that would produce a flatter curve whereby the curve would intersect the parabola, even a curve that had a better fit to the path of the parabola would produce an increased delay in braking and there would then be, at least in a lower direction coefficient range, a danger that the front axle would lock first upon an application of the brakes of the brake system.

Figure 2:
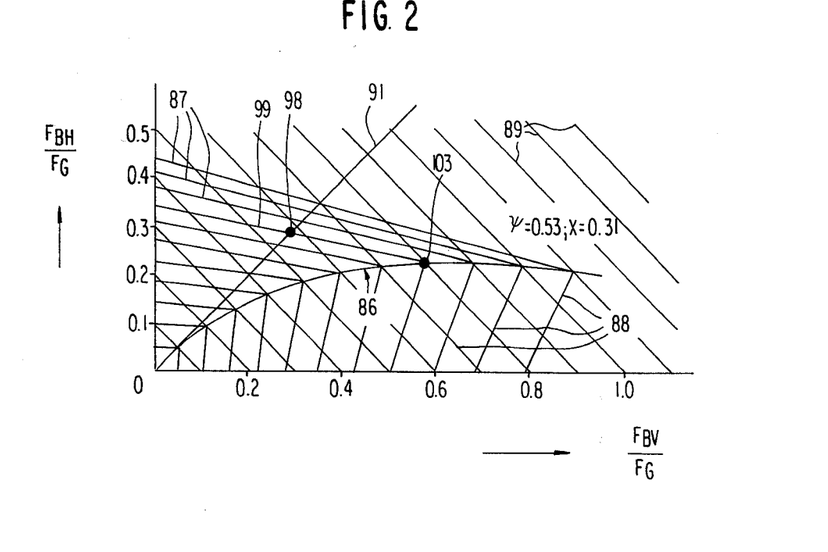
FIG. 2 is a braking force distribution graph for the braking system constructed in accordance with the present invention.
Figure 3:
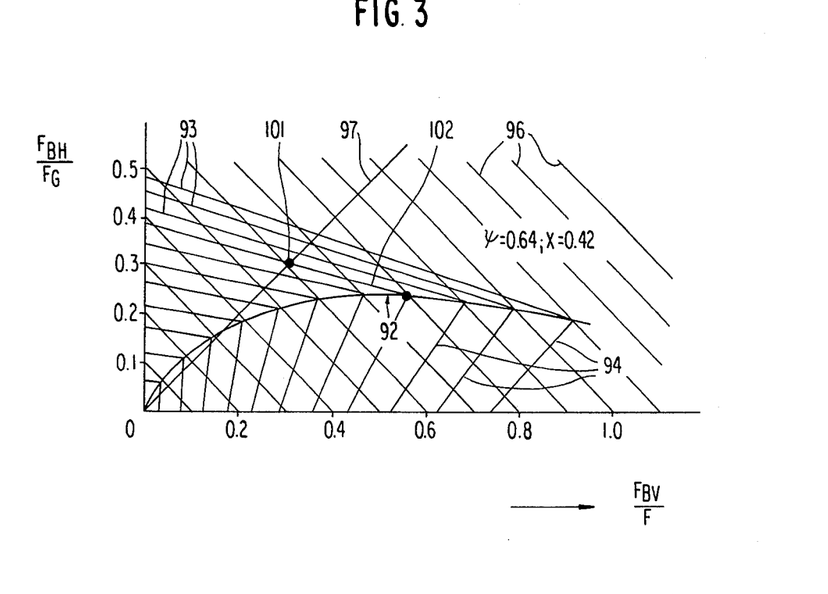
FIG. 3 is another braking force distribution graph explaining the function of the braking system of FIG. 1.

FIGS. 2 and 3 provide a graphical explanation of the advantageous tuning or adjusting of the brake system 10 according to the present invention in order to achieve the best possible compromise.

FIG. 2 provides an example of a braking force distribution graph for a motorcycle with one rider with a typical $\psi$ value of 0.53 and a typical $\chi$ value of 0.31. In FIG. 2, the parabolas 86 represent the ideal braking force distribution, the family of curves 87 represent constant traction coefficients $\mu_H$ on the rear axle, the family of curves 88 represent constant traction coefficient $\mu_V$ for the front axle, the parallel curves 89 represent a constant brake application z, and the curves 91 represent characteristic fixed braking force distributions for sole application of the tandem main brake cylinder 11, in the event that the braking force distribution factor DB defined by the relationship (10) has a value of 1.

FIG. 3 provides an example of a corresponding brake force diagram for a motorcycle with two persons riding, with a typical $\psi$ value of 0.64 and a typical $\chi$ value of 0.42, with the parabola of ideal braking force distribution being designated by the reference numeral 92, the family of curves $\mu_H$ being designated 93, the family of curves $\mu V$ designated by the reference numeral 94, parallel curves of constant brake delay designated by the reference numeral 96, and a curve for the fixed braking force distribution, which has the same curve as in FIG. 2, being designated by the reference numeral 96.

Assuming a traction coefficient of $\mu_{H,V}<0.3$, the locking of the wheel may be avoided only by extremely careful brake application and therefore the locking sequence does not play a critical role in this area. The fixed braking force distribution may be designed or constructed in such a manner that the curve which is characteristic of the brake force distribution will intersect the parabola approximately at a point which corresponds to a braking delay of 0.3. For the latter braking delay, an intersection marking a critical braking delay $z_{crit}$ on curves 91 and 97 with parabolas 86 and 92 will generally follow the following relationships:

$$z_{crit}=(\psi-\phi)/\chi, \tag{14}$$

or $$\phi=\psi-z_{crit}. \tag{15}$$

A critical brake delay $z_{crit}=0.2$, in the illustrated example of FIG. 2, corresponds to a rear axle braking force component of $\phi_1=0.47$; whereas, in the example of FIG. 3, a rear axle braking force component of $\phi_2=0.56$. For a critical braking delay of 0.3, the corresponding values of $\phi_1=0.44$ and $\phi_2=0.51$ apply.

According to the relationship (10), a braking force distribution factor DB=1 corresponds to average 0.5 of the rear axle braking force components $\phi_1$ and $\phi_2$. Accordingly, in the braking system 10 of the present invention, in order to obtain the best possible compromise outlined above, the braking force distribution factor DB, depending on the special relationships, is selected to be approximately 0.8 and 1.2 and is preferably equal to 1.

In order to achieve good braking delays while retaining satisfactory stability properties, it is necessary to suitably dimension the effective piston surfaces $a_1$ and $a_2$ of the primary piston 48 and secondary piston 49 as well as the counterpiston 79 of the tandem main brake cylinder 11. With regard to the examples illustrated in FIGS. 2 and 3, it is assumed that the traction coefficient $\mu_{V,H}=0.8$ for the front-axle and rear-axle brake.

If the tandem main brake cylinder 11 is actuated with increasing foot power, with the relationships of FIG. 2, at the intersection 98 of lines 91 of the fixed braking force distribution with the lines 99 for the constant traction coefficient $\mu H=0.8$, the locking limit will be reached. With the case of FIG. 3, the locking limit will be reached at the point 101, at which the line intersects the critical line 102 for a $\mu_H$ of 0.8. For the purpose of explanation, it is assumed that the locking limit is not exceeded. For the intersections 98 and 101, the following relationships, based on the relationships (8) to (12) apply:

$$\frac{F_{BV}}{F_G} = \frac{\mu\psi}{DB(1+\mu\chi)+\mu\chi}, \tag{16}$$

and $$\frac{F_{BH}}{F_G} = \frac{\mu\psi}{\frac{\mu\chi}{DB}+\mu\chi+1}. \tag{17}$$

The braking delay z which corresponds to the embodiment of FIG. 2 then, in accordance with the relationship (7), amounts to 0.56 while that which corresponds to the embodiment illustrated in FIG. 3 is 0.62. If only the rear axle is braked, the corresponding braking delays would be 0.34 and 0.38, respectively. It is clear from the above that the combined actuation of the front axle braking circuit and the rear axle braking circuit produced by the tandem main brake cylinder 11, in the sense of the fixed braking force distribution according to lines 91 and 97, constitutes a definite improvement over a conventional braking system.

For a further increase in the braking delay, the main braking cylinder 12 is now actuated with a manual force, assuming that the feedback circuit 13 reduces the braking force in the rear axle braking circuit sufficiently strongly to avoid a locking of the rear wheel.

An optimum layout of the area ratio $A_2/A_1$ of the effective surfaces of the counter-piston 79 and secondary piston 49 or primary piston 48 would then be produced for this situation if, with an increasing rise in braking pressure $P_{V2}$, the braking state would change exactly along the lines 99 with a $\mu_H=0.8$ until the locking limit is also reached at the point 103 where it intersects the parabola 86.

At the intersection 103, in accordance with the relationships (11) and (12) in general, the following relationships apply because $z=\mu_H=\mu_V=\mu$:

$$F_{BV}/F_G=\mu(1-\psi+\mu\chi), \tag{18}$$

and $$F_{BH}/F_G=\mu(\psi-\mu\chi). \tag{19}$$

The following relationships then derive directly from the relationships (16) to (19) for the ratio of the effective braking forces $(F_{BV}/F_G)_{103}$ and $(F_{BH}/F_G)_{103}$, effective at the intersection 103 of lines 99 with the parabola 86, to the braking forces effective at the intersection 98 of lines 91 with lines 99 for a $\mu_H=0.8$:

$$\frac{(F_{BV}/F_G)103}{(F_{BV}/F_G)98} = \frac{[DB(1 + \mu\chi) + \mu\chi](1 - \psi + \mu\chi)}{\psi} \quad (20)$$

and $$\frac{(F_{BH}/F_G)103}{(F_{BH}/F_G)98} = \frac{[\mu\chi/DB + (1 + \mu\chi)](\psi - \mu\chi)}{\psi}. \quad (21)$$

At the intersection 98 which represents a reaching of a locking limit for the rear axle, the braking pressure $P_{V1}$ becomes effective on the front axle and the braking pressure $P_{H1}$ becomes effective on the rear axle. Similarily, at the intersection 103 of the lines 99 with the parabola 86, which represents a reaching of the locking limit on the front axle, the braking force $P_{V2}$ becomes effective on the front axle and the braking pressure $P_{H2}$ becomes effective on the rear axle. Since the ratio of the braking forces is equal to a ratio of the corresponding braking fluid pressures, the following relationships apply which correspond to the relationships (20) and (21):

$$\frac{P_{V2}}{P_{V1}} = \frac{[DB(1 + \mu\chi) + \mu\chi](1 - \psi + \mu\chi)}{\psi}, \quad (22)$$

and $$\frac{P_{H2}}{P_{H1}} = \frac{[\mu\chi/DB + (1 + \mu\chi)](\psi - \mu\chi)}{\psi}. \quad (23)$$

Additionally, by virtue of the relationship (4) the following relationship is also applicable:

$$P_{H1} = P_{V1}, \quad (24)$$

and, in accordance with the relationship (5):

$$P_{H2} = \frac{P_{V1} - (A_2/A_1)P_{V2}}{1 - A_2/A_1}, \quad (25)$$

It follows from the relationship (25), when taking into account the relationship (24) that the following relationship also equally applies:

$$\frac{A_2}{A_1} = \frac{1 - P_{H2}/P_{H1}}{P_{V2}/P_{V1} - P_{H2}/P_{H1}}, \quad (26)$$

By virtue of the relationship (26), the optimum values of the area ratio for a given set of paramaters $\psi, \chi$, and $\mu$ as well as for a fixed braking pressure distribution factor DB under the above conditions can be readily calculated.

Since an optimization is only possible for a certain set of parameters, in constructing the braking system 10 of the present invention, a value which is suitable from a standpoint of being the best possible compromise must be determined.

For the example shown in FIG. 2, i.e., a two-wheeled vehicle with one rider, with $\mu = 0.166$ will be a traction coefficient for $A_2/A_1$ and 0.135 will be a corresponding value for $\mu = 0.6$.

For the arrangement of FIG. 3, that is, the two-wheeled vehicle with two riders, the corresponding $A_2/A_1$ values will be 0.201 and 0.167.

From the above, it follows that a favorable value, one which differs only slightly from the optimum, for the area ratio $A_2/A_1$ is approximately 0.16 which corresponds, for example, with round piston surfaces, to a diameter ratio $d_2/d_1$ for approximately 0.4. Favorable braking delay values are also reached if the ratio is between 0.3 and 0.5.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A hydraulic braking system for two-wheeled vehicles, the braking system including a first main brake cylinder means connected with a rear axle braking circuit, means for actuating the first main brake cylinder means, a second main brake cylinder means connected with a front axle braking circuit, means for actuating the second main brake cylinder means, means for distributing a brake force in a predetermined ratio when the first main brake cylinder means is actuated so as to produce a pressurization of both the front axle and rear axle braking circuits and to reduce the pressure in the rear axle braking circuit when the second main brake cylinder is simultaneously actuated with the first main brake cylinder, characterized in that the first main brake cylinder means includes a tandem main brake cylinder having a primary pressure chamber means forming an output pressure chamber means for the front axle braking circuit, an axially displaceably mounted primary and secondary piston means axially delimiting the primary pressure chamber means, a second pressure chamber means axially delimited by the secondary piston means and an inner wall of a housing of the first main brake cylinder means forming an output pressure chamber for the rear axle braking circuit, the second main brake cylinder means includes an output pressure chamber means, a displaceably mounted piston means for delimiting an annular pre-pressure chamber means, means for communicating the annular pre-pressure chamber means with the output pressure chamber means of the second main brake cylinder means when the piston means of the second main brake cylinder means is in a rest position, means are provided for pressure tight sealing off communication between the pre-pressure chamber means and the output pressure chamber means of the second main brake cylinder means after a displacement of the piston means of the second main brake cylinder means a small fraction of a working stroke, and in that feedback means are provided for exerting a restoring force proportional to a front axle braking pressure on the secondary piston means of the tandem main brake cylinder.

2. A braking system according to claim 1, characterized in that the means for actuating the first main brake cylinder means includes a brake pedal means, and in that the means for actuating the second main brake cylinder means includes a manually operable level means.

3. A braking system according to claim 1, characterized in that the feedback means includes a piston means for exerting a restoring force on the secondary piston means, and means for exposing the piston means of the feedback means to an output pressure of the output pressure chamber means of the second main brake cylinder means.

4. A braking system according to claim 3, characterized in that the piston means of the second main brake cylinder means includes two axially spaced piston flanges defining an axial length of the pre-pressure chamber means, a slotted piston rod means is provided for connecting the piston flanges, the output pressure chamber means of the second main brake cylinder means is defined between one of the piston flanges and an inner wall of the second main brake cylinder means, the means for communicating the annular pre-pressure chamber means with the output pressure chamber means of the second main brake cylinder means includes a valve means disposed in the piston flange defining the output pressure chamber means of the second main brake cylinder means, and in that the means for pressure tight sealing includes a means for urging the valve means into a closed position when the piston means of the second main brake cylinder means is displaced from the rest position.

5. A braking system according to claim 4, characterized in that the valve means includes a valve bore provided in the piston flange defining the output pressure chamber means of the second main brake cylinder means and terminating in a valve seat disposed in an outer end of said piston flange, a valve body cooperable with the valve seat, and a valve stem connected to the valve body, the means for communicating the annular pre-pressure chamber means with the output pressure chamber means of the second main brake cylinder means includes a pin means provided in a housing of the second main brake cylinder means and extending into the pre-pressure chamber means, the pin means is adapted to be accommodated in a slot of the slotted piston rod means so as to extend radially therethrough and traverse the slot as the piston means of the second main brake cylinder means is displaced, and in that the pin means cooperates with the valve stem to hold open the valve means when the piston means of the second main cylinder means is in the rest position.

6. A braking system according to claim 5, characterized in that the means for urging includes a pre-tensioned compression spring acting upon the valve body.

7. A braking system according to claim 6, characterized in that the pin means is integrally formed with the housing of the second main brake cylinder means, and in that the valve means is centrally disposed with respect to the piston flange defining the output pressure chamber means of the second main brake cylinder means.

8. A braking system according to claim 5, characterized in that the first main brake cylinder means further includes a counter pressure chamber means for accommodating the piston means of the feedback means, the secondary piston means includes a first piston area on a side thereof delimiting the primary pressure chamber means and a second piston area less than the first piston area and forming the piston means of the feedback means, the piston means of the feedback means delimits the counterpressure chamber means, and in that the means for exposing the piston means of the feedback means to the output pressure includes a pressure line means for communicating the secondary pressure chamber means with an output pressure line of the output pressure chamber means of the second main brake cylinder means.

9. A braking system according to claim 8, characterized in that a ratio of the first piston area to the second piston area is between 0.1 and 0.25.

10. A braking system according to claim 8, characterized in that a ratio of the first piston area to the second piston area is between 0.3 and 0.5.

11. A braking system according to claim 8, characterized in that a ratio of the first piston area to the second piston area is equal to 0.16.

12. A braking system according to claim 8, characterized in that a ratio of the first piston area to the second piston area is equal to 0.4.

13. A braking system according to one of claims 1, 2, 3, 4, 5, 8, 9, 10, 11, or 12, characterized in that the means for distributing a brake force has a characteristic brake force distribution factor for a sole actuation of the tandem main brake cylinder of between 0.8 and 1.2.

14. A braking system according to claim 13, characterized in that the characteristic brake force distribution factor is equal to 1.

15. A braking system according to claim 8, characterized in that the first and second piston areas are circular, and in that a ratio of diameters of the circular piston areas is between 0.1 to 0.25.

16. A braking system according to claim 8, characterized in that the first and second piston areas are circular, and in that a ratio of diameters of the circular piston areas is between 0.3 and 0.5.

17. A braking system according to claim 8, characterized in that the first and second piston areas are circular, and in that a ratio of diameters of the circular piston areas is equal to 0.16.

18. A braking system according to claim 8, characterized in that the first and second piston areas are circular, and in that a ratio of diameters of the circular piston areas is equal to 0.4.

19. A braking system according to claim 3, characterized in that the first main brake cylinder means further includes a counter pressure chamber means for accommodating the piston means of the feedback means, the secondary piston means includes a first piston area on a side thereof delimiting the primary pressure chamber means and a second piston area less than the first piston area and forming the piston means of the feedback means, the piston means of the feedback means delimits the counterpressure chamber means, and in that the means for exposing the piston means of the feedback means to the output pressure includes a pressure line means for communicating the secondary pressure chamber means with an output pressure line of the output pressure chamber means of the second main brake cylinder means.

20. A braking system according to one of claims 1 or 2, characterized in that the piston means of the second main brake cylinder means includes two axially spaced piston flanges defining an axial length of the pre-pressure chamber, a slotted piston rod means is provided for connecting the piston flanges, the output pressure chamber means of the second main brake cylinder means is defined between one of the piston flanges and an inner wall of the second main brake cylinder means, the means for communicating the annular pre-pressure chamber means with the output pressure chamber means of the second main brake cylinder means includes a valve means disposed in the piston flange defining the output pressure chamber means of the second main brake cylinder means, and in that the means for pressure tight sealing includes a means for urging the valve means into a closed position when the piston means of the second main brake cylinder means is displaced from the rest position.

21. A braking system according to claim 20, characterized in that the valve means includes a valve bore provided in the piston flange defining the output pressure chamber means of the second main brake cylinder means and terminating in a valve seat disposed in an outer end of said piston flange, a valve body cooperable with the valve seat, and a valve stem connected to the valve body, the means for communicating the annular pre-pressure chamber means with the pressure chamber means of the second main brake cylinder means includes a pin means provided in a housing of the second main brake cylinder means and extending into the pre-pressure chamber means, the pin means is adapted to be accommodated in a slot of the slotted piston rod means so as to extend radially therethrough and traverse the slot as the piston means of the second main brake cylinder means is displaced, and in that the pin means cooperates with the valve stem to hold open the valve means when the piston means of the second main cylinder means is in the rest position.

* * * * *